(No Model.)
J. H. WATSON.
HAME HOOK.
No. 437,064.  Patented Sept. 23, 1890.
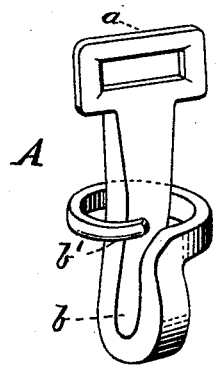
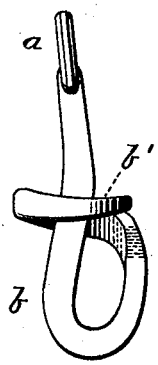
WITNESSES
Villette Anderson,
Philip C. Masi.
INVENTOR
John H. Watson
by E. W. Anderson
his Attorney

UNITED STATES PATENT OFFICE.

JOHN H. WATSON, OF SELMA, CALIFORNIA.

HAME-HOOK.

SPECIFICATION forming part of Letters Patent No. 437,064, dated September 23, 1890.

Application filed May 8, 1890. Serial No. 350,993. (No model.)

*To all whom it may concern:*

Be it known that I, JOHN H. WATSON, a citizen of the United States, and a resident of Selma, in the county of Fresno and State of California, have invented certain new and useful Improvements in Safety Spiral Harness and Whiffletree Hooks; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention and is a perspective view. Fig. 2 is a side view.

This invention relates to certain improvements in harness-hooks more especially adapted for use with hame-hooks for effecting the connection between the same and the traces; and it consists in the construction and novel combination of parts, as will appear from the following description and accompanying drawings.

In the drawings, A refers to the hook, the shank of which has at one end an eye or loop $a$, preferably rectangular, although it may be of other suitable form, to provide for its attachment to a whiffletree, for instance. This shank has its opposite end formed into a loop $b$, having its inner end terminating in a circular spiral hook $b'$, encircling but spaced apart from said shank and terminating or stopping near its point of beginning.

It will be observed that in order to apply the fastening—say, for example, to a whiffletree, loop, or eye—the trace or strap is given a turn. The eye or loop thereof then being presented to the point of the hook is passed on the hook, in accomplishing which the trace will be restored to its former or original position, effectually securing the trace to the whiffletree-hook, thus preventing any possibility of its accidental detachment.

Having described this invention, what I claim, and desire to secure by Letters Patent, is—

The harness-hook having its shank provided at one end with an eye and provided at the other end with a loop curved or extended upward at the forward side of said shank and terminating at its inner end in a spiral circular hook, encircling and spaced off from said shank about at the middle thereof and stopping near or a short distance from its point of beginning, the said hook occupying a plane at right angles with the length of said shank, substantially as set forth.

In testimony whereof I affix my signature in presence of two witnesses.

JOHN H. WATSON.

Witnesses:
J. N. MCFATTER,
J. A. LOWE.